Oct. 12, 1937.   D. K. ALLISON   2,095,305
ELECTROMETRIC APPARATUS
Filed Oct. 23, 1934

INVENTOR.
Donald K. Allison,
BY Robert W. Fulwider
ATTORNEY.

Patented Oct. 12, 1937

2,095,305

UNITED STATES PATENT OFFICE 2,095,305

ELECTROMETRIC APPARATUS

Donald K. Allison, Beverly Hills, Calif.

Application October 23, 1934, Serial No. 749,559

3 Claims. (Cl. 175—183)

My invention relates to electrical measuring apparatus and particularly to apparatus used in the determination of unknown electromotive forces and resistances. Broadly speaking, my invention combines the characteristics of a null-method potentiometer and a direct-reading resistance meter, but one instrument being necessary to perform the functions formerly accomplished by separate devices.

The primary object of my invention is to provide a device by which practically any electrometric investigation encountered in the industrial or research laboratory may be carried out with a maximum of speed and accuracy. The apparatus comprising my invention is particularly valuable in the rapid and accurate measurement of electromotive forces such as are encountered in the measurement of pH values by electrode potentials, potentiometric titrations, thermocouple pyrometer measurements and the like. It also finds great utility in conductance measurements, conductometric titrations, sugar-ash determinations and many other uses.

It is an object of my invention to provide an apparatus for accomplishing the foregoing without the use of standard cells and which because it eliminates the operation of repeated standardization against delicate E. M. F. standards, effects a saving in time in making measurements.

By the arrangement of parts as illustrated and described, I have provided an electrical measuring apparatus which is simple, sturdy, very portable and more accurate than other devices now on the market, which can even approximate the wide range of operations possible with my invention. In one device I have provided for practically all necessary electrometric determinations which so far as I know has never been successfully accomplished before. Furthermore, both E. M. F. and resistance can be read directly from scales on the same meter without the use of factors, a great time saver in operation.

Figure 1:
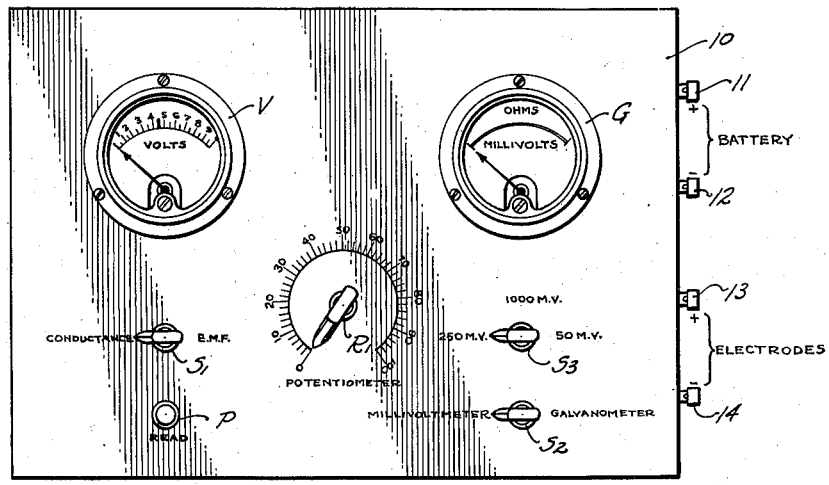
Fig. 1 shows the panel of one form of my device.

Referring now to the drawing and particularly to Fig. 1, the numeral 10 indicates a panel preferably made of "Bakelite" or some other non-conducting substance, provided with suitable openings to accommodate a galvanometer G, a voltmeter V, a variable resistance $R_1$, switch keys $S_1$, $S_2$ and $S_3$, and a spring switch P. These various scales and switches may be spaced in any number of ways, but I find the arrangement illustrated to be very efficient in that it permits of the various parts being housed in a comparatively small space. Terminals 11 and 12 are provided at one end of the panel 10 to be connected to a source of current, and terminals 13 and 14 serve to connect with the unknown E. M. F. or resistance being measured.

Figure 2:
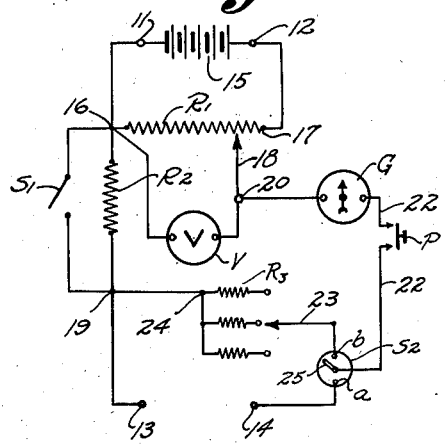
Fig. 2 is the wiring diagram for the panel shown in Fig. 1.

Considering now the wiring diagram in Fig. 2, the numeral 15 indicates a battery or other suitable source of current connected to the terminals 11 and 12 respectively. Connected across the terminals 11 and 12 is a variable resistance $R_1$, having terminals 16 and 17 and movable lead 18 which connects to a terminal 20. This assembly of battery, resistance and movable lead is quite generally known as a potentiometer and will hereinafter be referred to as such. A resistance $R_2$ is connected to terminal 16 of the potentiometer, the other terminal of $R_2$ being indicated by the number 19. A short-circuiting switch $S_1$ of low resistance is also provided across the terminals 16 and 19. A voltmeter V is connected across the terminals 16 and 20, and terminal 19 is connected to terminal 13.

One side of a galvanometer G is connected to terminal 20 and the other side of G is connected by lead 22 through a spring switch P to the pole of a single pole double throw switch $S_2$. One side of $S_2$ which I will denote as "a" is connected to one of the unknown terminals 14. The other side of the switch $S_2$ which is lettered b is connected to the adjustable connector 23 of a three-bank resistance $R_3$, which in the form of my device shown has resistances of 50 ohms, 250 ohms, and 1000 ohms respectively. The fixed terminal 24 of the resistance $R_3$ is connected to terminal 19 of $R_2$.

Galvanometer G is calibrated both in millivolts and ohms, with three ranges of sensitivity on the millivolt scale permitting accurate measurement of E. M. F. up to 1000 millivolts while substantially infinite resistance can be measured. The resistance $R_2$ depends, of course, on the desired characteristics of the instrument and as one example of a satisfactory value therefor, I use a resistance of 4500 ohms. The spring switch P is provided in the galvanometer circuit so that switch $S_2$ can always be in closed position in contact with either a or b.

The measurement of E. M. F. by the device shown is very simple. First the source of unknown E. M. F. which I will call $E_x$ is connected across the terminals 13 and 14 and switch $S_1$ is closed, short circuiting $R_2$. By moving lead 18 along $R_1$ with switch $S_2$ in contact with terminal $a$, $E_x$ can be balanced against the E. M. F. from current source 15 until no current flows in the system as shown by the needle of galvanometer G resting at zero. This can be done with the reading switch P closed throughout the balancing operation, or being closed successively after each change of $R_1$.

When the null point has been reached, the switch $S_2$ is thrown over to position $b$, which cuts out $E_x$ and permits a reading of the equivalent E. M. F. direct in millivolts on the appropriate scale of G which is selected by the setting of connector 23 on the proper resistance of $R_3$.

When it is desired to measure an unknown resistance $R_x$, it is connected across terminals 13 and 14 and switch $S_1$ is opened thus putting the resistance $R_2$ in series with the unknown $R_x$. With the galvanometer circuit open, the voltage across terminals 16 and 20 is adjusted to a predetermined value by varying the position of connector 18 along resistance $R_1$. Switch $S_2$ is then thrown to $a$, the reading switch P closed and the correct value of $R_x$ read on the ohms scale of G. This resistance scale is calibrated by the relation of $$R_x = \frac{V}{I} - R_2$$

and for the arrangement as shown, I use a value of 4500 ohms for $R_2$ as previously mentioned.

Figure 4:
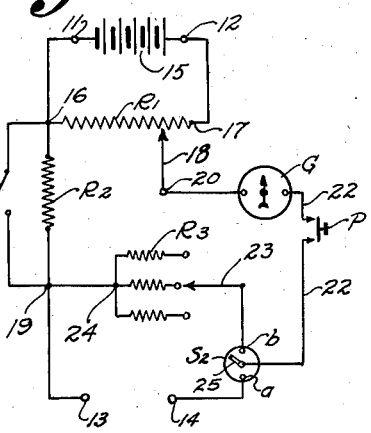
Fig. 4 is a wiring diagram of a modified form using but one meter.
Figure 3:
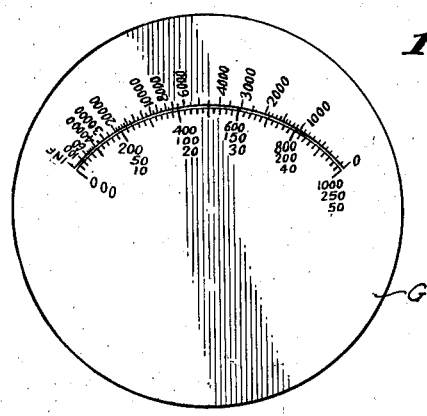
Fig. 3 is an enlarged view of the scale of the galvanometer G.

As will be seen from an inspection of Fig. 4, the modified form shown therein is precisely the same as the one shown in Fig. 2 except that voltmeter V is omitted, otherwise all connections and terminals are the same. Likewise, the panel 10 is the same except that no voltmeter appears thereon.

To measure $E_x$ by this modified form of electrometer, $S_1$ is closed as before, $S_2$ is thrown over to $a$ and $E_x$ is balanced against the E. M. F. from the current source 15. When G reads zero $S_2$ is thrown over to $b$ position and $E_x$ is read directly on the millivolt scale of G.

To measure an unknown resistance $R_x$ the switch $S_1$ is opened to put $R_2$ in the circuit. Then with $S_2$ at $b$, a known P. D. is established across points 19 and 25, the voltage being read on G by varying $R_1$. This P. D. for a given instrument is always the same and may be indicated by a red line, arrow or other index on the scale of G to facilitate quick setting. When this known P. D. is established, $S_2$ is thrown to $a$ and by reason of the specially calibrated scale on G, the resistance is read directly, $R_x$ again being equal to $$\frac{V}{I} - R_2$$

With $R_2$ equal to 4500 ohms, the predetermined P. D. is 4.5 volts.

Because it is slightly more simple than the preferred type illustrated in Fig. 2, this modified form of my invention can be constructed more cheaply than the two-meter type. However, the two-meter type has an advantage by reason of the fact that when $R_x$ is extremely low the current drain in the one-meter type during reading is such that the previously established P. D. across G becomes less, due to the I. R. drop, and consequently the reading of $R_x$ is correspondingly higher by a small amount. With the two-meter type on the other hand, it is possible to adjust the standard P. D. with reference to the index during the operation of reading resistance and strictly true values are thus obtained.

While the forms of my invention shown and described herein are fully capable of providing the advantages and attaining the objects mentioned, it is to be understood that these forms are merely illustrative of the fundamental principles involved and that numerous changes in appearance and arrangement of elements can be made without in any way going beyond the proper scope of my invention as defined by the appended claims.

I claim as my invention:

1. In an electrometric apparatus the combination of: a potentiometer which includes a source of electrical energy and a resistance connected thereacross with a variable output lead; a circuit comprising a galvanometer and a pair of terminals across which a source of unknown E. M. F. can be connected; means for varying the position of said output lead to balance said source of electrical energy against said unknown E. M. F. so that no current flows therethrough; and switching means adapted to replace said source of unknown E. M. F. in said circuit with a known resistance the equivalent E. M. F. of said potentiometric source being read on said galvanometer.

2. In an electrometric apparatus the combination of: a source of electrical energy; potentiometric means for establishing E. M. F. values in a circuit containing a source of unknown E. M. F. and adjusting said established values to equal said unknown E. M. F.; a meter in said circuit for reading said established E. M. F. values; and means for causing said source of electrical energy to produce a flow of current through an unknown resistance placed in said circuit, the magnitude of said current being indicated on a meter, said indications being a function of said unknown resistance.

3. In an electrometric apparatus the combination of: an adjustable potentiometer including a source of electrical energy and a resistance connected thereacross with a variable output lead; a circuit with a galvanometer therein connected to said potentiometer, said potentiometer being so arranged that its E. M. F. can be varied to exactly equal and oppose an unknown E. M. F. in said circuit, the point of exact equality of opposition being indicated on said galvanometer; and switching means for replacing said unknown E. M. F. in said circuit with a calibrating resistance of such value that the deflection of said galvanometer becomes an indication of the value of said unknown E. M. F.

DONALD K. ALLISON.